US012567878B2

(12) United States Patent
Zou et al.

(10) Patent No.: US 12,567,878 B2
(45) Date of Patent: Mar. 3, 2026

(54) COMMON CONTROL CHANNEL-FREE COMMUNICATION METHOD AND SYSTEM FEATURING INTEGRATED AUTONOMOUS LINK ESTABLISHMENT AND FREQUENCY CONVERSION

(71) Applicant: NANJING UNIVERSITY OF POSTS AND TELECOMMUNICATIONS, Nanjing (CN)

(72) Inventors: Yulong Zou, Nanjing (CN); Gen Pan, Nanjing (CN); Jia Zhu, Nanjing (CN); Jiajun Wang, Nanjing (CN)

(73) Assignee: NANJING UNIVERSITY OF POSTS AND TELECOMMUNICATIONS (CN)

( * ) Notice: Subject to any disclaimer, the term of this patent is extended or adjusted under 35 U.S.C. 154(b) by 179 days.

(21) Appl. No.: 18/554,733

(22) PCT Filed: May 7, 2021

(86) PCT No.: PCT/CN2021/092107
§ 371 (c)(1),
(2) Date: Oct. 10, 2023

(87) PCT Pub. No.: WO2022/222196
PCT Pub. Date: Oct. 27, 2022

(65) Prior Publication Data
US 2024/0048176 A1 Feb. 8, 2024

(30) Foreign Application Priority Data
Apr. 20, 2021 (CN) .......................... 202110422389.9

(51) Int. Cl.
*H04B 1/715* (2011.01)

(52) U.S. Cl.
CPC ..................................... *H04B 1/715* (2013.01)

(58) Field of Classification Search
CPC .......... H04B 1/69; H04B 1/713; H04B 1/715; H04B 1/7154; H04B 1/7152;
(Continued)

(56) References Cited

U.S. PATENT DOCUMENTS 11,219,033 B2 * 1/2022 Zou ...................... H04W 72/541
12,316,444 B2 * 5/2025 Zou ....................... H04W 56/00
(Continued)

*Primary Examiner* — James M Perez

(57) ABSTRACT

A common control channel-free communication method and system featuring integrated autonomous link establishment and frequency conversion, belonging to the technical field of wireless communication is provided. The method comprises: autonomously establishing, by a caller communication node a two-way communication link with a responder communication node through a calling and responding mechanism; and monitoring, by the caller communication node, operating frequency points through a real-time interference detection mechanism, and autonomously updating transmitted signal feature parameters of the caller communication node at certain frequency conversion slots, so that the responder communication node can update transmitted signal feature parameters in the responder communication node after receiving the updated transmitted signal feature parameters. According to the communication method and system of the invention, the packet loss rate of the wireless communication system is reduced, and the anti-interference ability and reliability of the wireless communication system are improved.

8 Claims, 3 Drawing Sheets

(58) Field of Classification Search
CPC ........ H04B 1/7143; H04B 1/71; H04B 1/707;
H04B 1/7097; H04B 1/7103
See application file for complete search history.

(56) References Cited

U.S. PATENT DOCUMENTS

| | | | | |
|---|---|---|---|---|
| 2007/0165696 A1* | 7/2007 | Agrawal | ............. | H04W 36/185 |
| | | | | 375/136 |
| 2008/0112426 A1* | 5/2008 | Seidel | ................... | H04W 16/14 |
| | | | | 370/431 |
| 2009/0003413 A1* | 1/2009 | Jang | ....................... | H04B 1/715 |
| | | | | 375/135 |
| 2009/0310578 A1* | 12/2009 | Convertino | .......... | H04W 76/23 |
| | | | | 370/338 |
| 2011/0163900 A1* | 7/2011 | Pagnanelli | ............ | H03M 3/468 |
| | | | | 341/166 |
| 2012/0282942 A1* | 11/2012 | Uusitalo | ............... | H04W 16/14 |
| | | | | 455/452.2 |
| 2013/0058245 A1* | 3/2013 | Van Lieshout | ....... | H04W 36/04 |
| | | | | 370/252 |
| 2013/0344883 A1* | 12/2013 | Rinne | ................... | H04L 5/0092 |
| | | | | 455/452.1 |
| 2014/0146857 A1* | 5/2014 | Guichard | ............. | H04B 1/7156 |
| | | | | 375/135 |
| 2017/0227971 A1* | 8/2017 | Shimotani | ............. | B60W 40/06 |
| 2018/0139635 A1* | 5/2018 | Oteri | ..................... | H04W 24/08 |
| 2018/0152986 A1* | 5/2018 | Jung | ...................... | H04W 76/27 |
| 2018/0295632 A1* | 10/2018 | Goodman | ......... | H04W 28/0236 |
| 2019/0052381 A1* | 2/2019 | Abdelmonem | ..... | H04L 27/2647 |
| 2019/0356466 A1* | 11/2019 | Kratz | .................... | H04J 3/0682 |
| 2020/0145169 A1* | 5/2020 | Zhou | ..................... | H04W 72/20 |
| 2021/0076390 A1* | 3/2021 | Zou | ...................... | H04W 72/541 |
| 2021/0345183 A1* | 11/2021 | Kalhan | ................. | H04W 28/26 |
| 2024/0048176 A1* | 2/2024 | Zou | ........................ | H04B 1/715 |
| 2024/0103123 A1* | 3/2024 | Meier | .................. | G01S 13/343 |
| 2024/0267863 A1* | 8/2024 | Hong | ................... | H04W 56/00 |
| 2025/0062849 A1* | 2/2025 | Zou | ...................... | H04B 1/7156 |

* cited by examiner

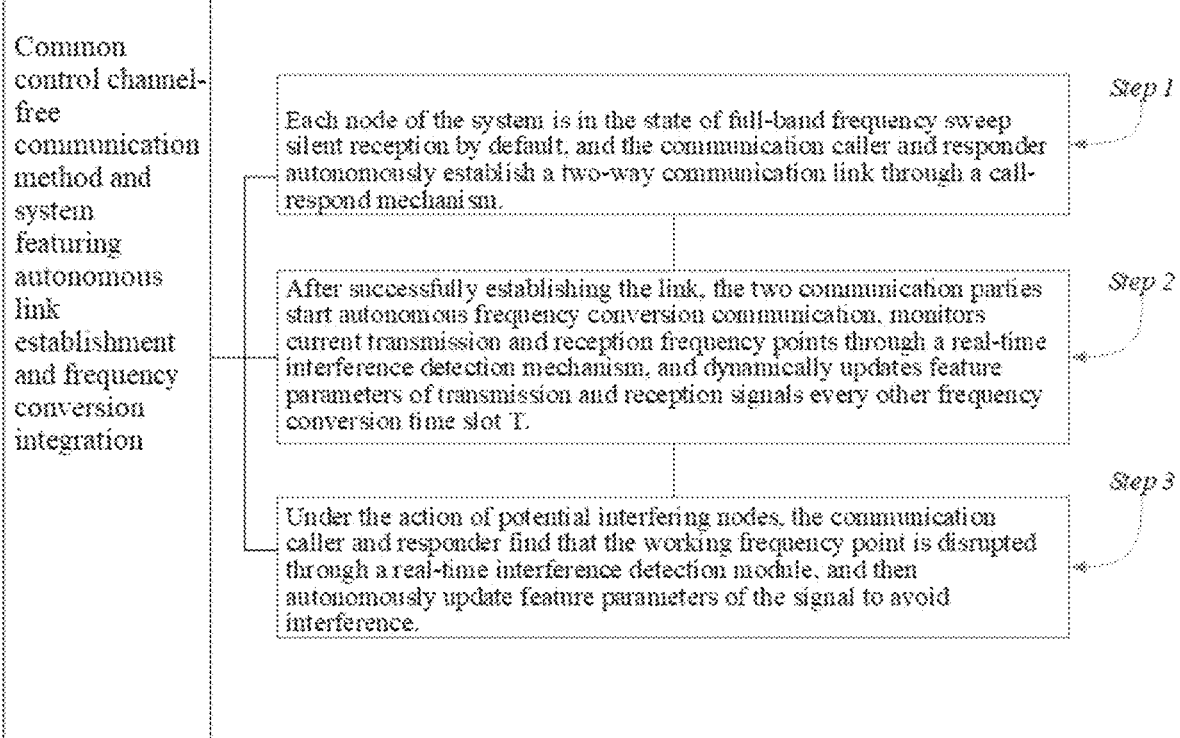

Common control channel-free communication method and system featuring autonomous link establishment and frequency conversion integration Each node of the system is in the state of full-band frequency sweep silent reception by default, and the communication caller and responder autonomously establish a two-way communication link through a call-respond mechanism.    *Step 1*

After successfully establishing the link, the two communication parties start autonomous frequency conversion communication, monitors current transmission and reception frequency points through a real-time interference detection mechanism, and dynamically updates feature parameters of transmission and reception signals every other frequency conversion time slot T.    *Step 2*

Under the action of potential interfering nodes, the communication caller and responder find that the working frequency point is disrupted through a real-time interference detection module, and then autonomously update feature parameters of the signal to avoid interference.    *Step 3*

Fig. 1

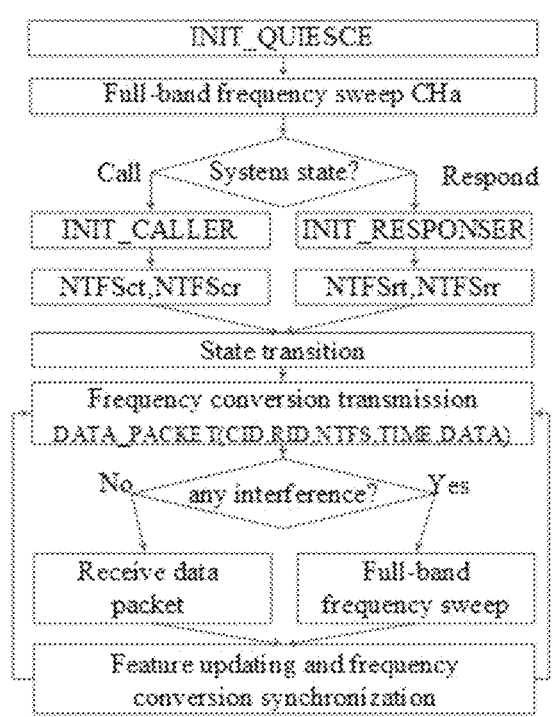

User
call-respond
autonomous
link
establishment
process

Real-time
autonomous
frequency
conversion
anti-
interference
process

INIT_QUIESCE: Initialize silent reception
INIT_CALLER: Caller initialization branch
INIT_RESPONSER: Responder initialization branch
CHa: Sweep frequency band [f1,f2] set by system
NTFSct: Caller transmitted signal feature set
NTFScr: Caller received signal feature set
NTFSrt: Responder transmitted signal feature set
NTFSrr: Responder received signal feature set
DATA_PACKET: Data packet
CID,RID: Caller ID, responder ID
NTFS,TIME: Next transmitted signal feature set, time identification
DATA: User data information identification

Fig. 2

COMMON CONTROL CHANNEL-FREE COMMUNICATION METHOD AND SYSTEM FEATURING INTEGRATED AUTONOMOUS LINK ESTABLISHMENT AND FREQUENCY CONVERSION

FIELD

The invention belongs to the technical field of wireless communication, mainly relates to distributed autonomous link establishment technology and autonomous frequency conversion anti interference technology, in particular to a common control channel-free communication method featuring integrated autonomous link establishment and frequency conversion, and also relates to a common control channel-free communication system featuring integrated autonomous link establishment and frequency conversion.

BACKGROUND

Frequency hopping communication provides excellent anti-interference and anti-interception abilities. However, traditional frequency hopping systems still have many drawbacks in the face of increasingly complex electromagnetic environments. For example, a low hopping speed of the system makes transmitted data packets vulnerable to inter-ception by a hostile reconnaissance aircraft, and it requires meticulous synchronization. Moreover, a hopping pattern is predetermined and fixed through negotiation between trans-mitting and receiving ends. Therefore, a hopping sequence cannot be updated once it has been generated by the con-ventional frequency hopping technology. Even if a certain frequency hopping point is disrupted, the system must continue to communicate at this disrupted frequency point to maintain frequency hopping synchronization, which may lead to a high error rate and, in serious cases, communication interruptions. Additionally, when multiple users need to communicate simultaneously, the probability of collisions between distinct operating frequency points rises if a sig-nificant number of duly authorized communication nodes and unauthorized users are present. While ultra-high fre-quency hopping rates can effectively combat the malicious interference from unauthorized users, several of the afore-mentioned challenges remain unresolved. Hence, cognitive frequency hopping technology is developed.

The cognitive frequency hopping technology can effec-tively overcome many drawbacks of conventional frequency hopping systems. Its basic idea is perceiving and learning the complex electromagnetic spectrum environment to adap-tively alter system parameters and update frequency points, thus avoiding disrupted or invalid frequency points. Although the cognitive frequency hopping technology improves the anti-interference capability of conventional frequency hopping systems, it also increases system com-plexity. Moreover, the cognitive frequency hopping technol-ogy only updates frequency points when communication is disrupted, which raises the packet loss rate and signal processing speed requirements.

SUMMARY

The invention aims to overcome the shortcomings in the prior art and provides a common control channel-free com-munication method featuring integrated autonomous link establishment and frequency conversion, which allows two communication parties to realize anti-interference through autonomous frequency conversion communication.

In order to solve the above technical problems, the technical scheme adopted by the invention is as follows.

In a first aspect, the invention provides a common control channel-free communication method featuring integrated autonomous link establishment and frequency conversion, which comprises the following steps:

establishing a two-way communication link between two communication parties; and performing autonomous frequency conversion communi-cation between the two communication parties.

Optionally, after the two-way communication link is established between the two communication parties, each communication party obtains a feature parameter set sent by the other party, and the two communication parties perform autonomous frequency conversion communication based on the obtained feature parameter sets.

Optionally, data packet fields transmitted by the two communication parties in the communication process com-prise: caller ID (CID), responder ID (RID), frequency con-version time (TIME), transmitted data (DATA) and next TIME transmitted signal feature parameter set (NTFS);

the CID and the RID are used for verifying the identities of the two communication parties;

the TIME is own frequency conversion time, which is used for realizing frequency conversion synchroniza-tion between the two communication parties;

the DATA is information content to be transmitted by the two communication parties; and the NTFS is utilized to automatically update a feature parameter set of a signal, including but not limited to a frequency point, a bandwidth, a waveform, a modula-tion mode and other feature parameters, and freely combining the above feature parameters according to system requirements in a customized manner.

Optionally, establishing a two-way communication link between two communication parties through a call-respond mechanism comprises:

autonomously generating, by a caller, feature parameter sets $NTFS_{ct}$ and $NTFS_{cr}$ through spectrum sensing, taking the $NTFS_{ct}$ as a feature parameter set of a caller transmitted signal, and packaging the feature parameter set $NTFS_{cr}$ into a data packet for transmission;

autonomously identifying, by a responder, the feature parameter set $NTFS_{ct}$ of the caller transmitted signal through spectrum sensing, performing matching recep-tion, parsing the received data packet to obtain the feature parameter set $NTFS_{cr}$ and using it as a feature parameter set of a responder transmitted signal, and autonomously generating a feature parameter set $NTFS_{rr}$ through spectrum sensing and packaging the feature parameter set $NTFS_{rr}$ into a data packet for transmission; and receiving, by the caller, the data packet using its own feature parameter set $NTFS_{cr}$ which is known and obtaining the feature parameter set $NTFS_{rr}$ through parsing, which indicates that the caller and the responder successfully establish the two-way commu-nication link.

Optionally, the spectrum sensing, in the process of estab-lishing the two-way communication link is full-band spec-trum sensing.

Optionally, performing autonomous frequency conver-sion communication between the two communication par-ties comprises:

a common control channel is not needed when the two communication parties dynamically update the NTFS for autonomous frequency conversion; specifically, receivers of the two communication parties autono-
mously generate NTFS$_n$ through spectrum sensing
every other frequency conversion time slot (T), and
then write it into the data packet to inform the other
party to update its NTFS by using the NTFS$_n$, so that
the two communication parties transmit signals based
on the feature parameter set sent by the other party.

Optionally, the method further comprises frequency con-
version synchronization after performing autonomous fre-
quency conversion communication between the two com-
munication parties; and the two communication parties inform each other of their
own TIME, and then determine a next TIME based on
the TIME, current time and a frequency conversion
time slot (T), so that the two communication parties
perform frequency conversion synchronously at the
same TIME.

Optionally, autonomous frequency conversion communi-
cation between the two communication parties further com-
prises interference detection of a receiving frequency point
during the frequency conversion communication process;

specifically, frequency sweep verification is performed at
the receiving frequency point many times in succes-
sion; in a case where a valid data packet is not received
even after multiple frequency sweep verification, it is
determined that there is interference at the current
receiving frequency point; and then full-band fre-
quency sweep reception is performed, and if still no
valid data packet is received, a two-way communica-
tion link is re-established.

Optionally, transmitted data packets are encrypted and
decrypted during the communication interaction between
the two communication parties.

Optionally; the spectrum sensing, in the autonomous
frequency conversion communication process is arbitrary
single or dual frequency point fast spectrum sensing.

In a second aspect, the invention provides a common
control channel-free communication system featuring inte-
grated autonomous link establishment and frequency con-
version, comprising a communication caller and a commu-
nication responder which are dynamically and randomly
distributed relative to each other, and the caller and the responder communicate by using the
communication method as mentioned above.

Compared with the prior art, the invention has the fol-
lowing beneficial effects: the common control channel-free
communication method featuring integrated autonomous
link establishment and frequency conversion provided by
the invention improves the anti-interference capability of a
wireless communication system through the spectrum sens-
ing technology and real-time generation and autonomous
update of the signal feature parameter sets while ensuring
that nodes in the system fully utilize the channel bandwidth,
and effectively addresses the issues of tracking interference
caused by leakage of pre-agreed hopping sequences of
traditional frequency hopping systems, as well as of high
packet loss rates experienced in cognitive frequency hop-
ping systems in a case where frequency points are updated
only when communication is disrupted, thus significantly
improving the reliability of wireless communication sys-
tems.

BRIEF DESCRIPTION OF THE DRAWINGS

FIG. 1 is a diagram of working steps of a common control
channel-free communication system featuring integrated
autonomous link establishment and frequency conversion
according to the invention;

FIG. 2 is a flow block diagram of the communication
process between a communication caller and a communica-
tion responder according to the invention.

DETAILED DESCRIPTION

Figure 3:
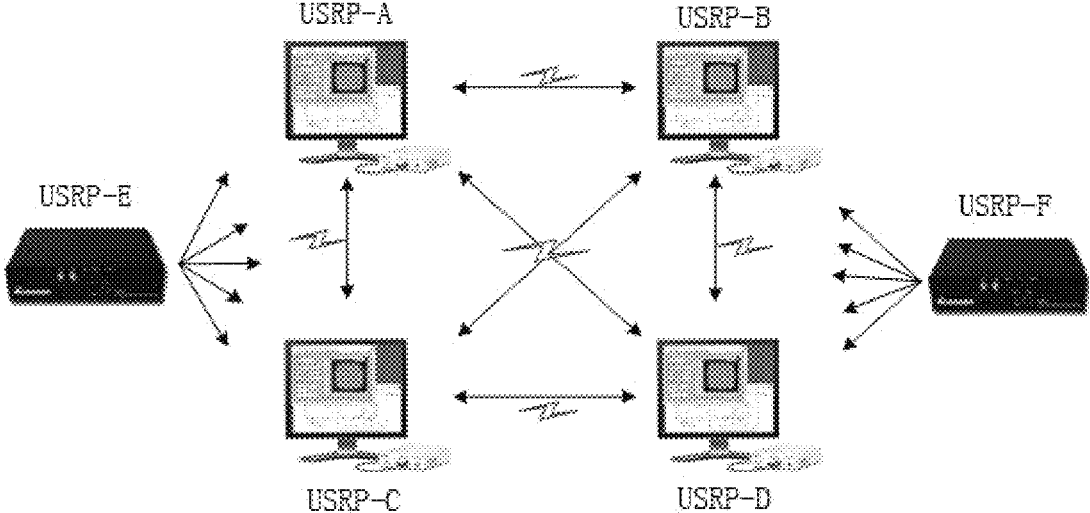
FIG. 3 is a structural diagram of a common control
channel-free communication system featuring integrated
autonomous link establishment and frequency conversion
according to the invention.

The invention will be described in detail with reference to
the accompanying drawings. The following embodiments
are only used to illustrate the technical scheme of the
invention more clearly, but cannot be used to limit the
protection scope of the invention.

Embodiment 1

Referring to FIG. 3, in the embodiment of the invention,
a wireless communication system composed of multiple
transmitting nodes, receiving nodes and potential interfering
nodes is built by means of software radio equipment USRP-
2920 and LabVIEW software. This system is a fully dis-
tributed system, that is, the system is composed of a series
of communication nodes which can be moved at will, and
the nodes are dynamically and freely distributed. There is no
control center in the system, and all nodes have equal status.
Autonomous link establishment and autonomous frequency
conversion communication can be performed anytime, any-
where without any other pre-established network facilities.
The system consists of four communication nodes (USRP-
A, USRP-B, USRP-C and USRP-D, each of which has
transmitting and receiving abilities, and can be used as a
transmitting node or a receiving node) and two interfering
nodes (USRP-E and USRP-F), the transmitting node serves
as a communication caller, the receiving node serves as a
communication responder, and the interfering node serves as
an interfering party.

In the communication process, data packets are transmit-
ted or received between communication nodes, and the
format of the data packets is defined as: caller ID (CID)+
responder ID (RID)+frequency conversion time (TIME)+
transmitted data (DATA)+next TIME transmitted signal fea-
ture parameter set (NTFS). It can be seen that the fields of
the data packet include: CID, RID, TIME, DATA and NTFS.

The CID and the RID are used for verifying the identities
of the two communication parties;

the TIME is used for realizing frequency conversion
synchronization between the two communication par-
ties;

the DATA is information content to be transmitted by the
two communication parties, which can be left blank in
the process of call-respond autonomous link establish-
ment; and the NTFS is used for autonomously updating a feature
parameter set of a signal, including but not limited to a
frequency point, a bandwidth, a waveform, a modula-
tion mode, and other feature parameters, and freely
combining the above feature parameter sets according
to system requirements in a customized manner. For
example, a frequency point of a signal is selected as the
feature parameter set, then the feature parameter set
NTFS only includes signal frequency point informa-
tion, and other feature parameters such as signal band-
width, waveform, and modulation mode than the fre-
quency point all adopt system default configurations,
that is, NTFS in this embodiment can only be used for autonomous updating of the frequency points of the two communication parties.

With reference to FIGS. 1 and 2, in the embodiment of the invention, a common control channel-free communication method featuring integrated autonomous link establishment and frequency conversion is provided, which is applied to a wireless communication system composed of a plurality of communication nodes and potential interfering nodes. For example, in the above-mentioned communication system shown in FIG. 3, the whole communication flow of the system comprises a user call-respond autonomous link establishment process and a real-time autonomous frequency conversion anti-interference process. The specific flow is described as follows.

In Step 1, that is, the user call-respond autonomous link establishment process, each node of the system is in the state of full-band frequency sweep silent reception by default, the caller autonomously selects the feature parameter set according to the real-time state of a wireless spectrum environment, the responder autonomously identifies the feature parameter set of the signal through full-band sensing for matching reception, and the two communication parties autonomously establish a link through a call-respond mechanism.

The user call-respond autonomous link establishment process is specifically performed as follows.

S1. Silent reception (INIT_QUIESCE): The communication system enters an initialization silent reception procedure (INIT_QUIESCE) at startup; by default, all communication nodes are in the silent reception state after the system is started; and in this state, full-band frequency sweep (CHa) is performed in the frequency band range [f1,f2] set by the system, and once autonomous identification indicates that there are data packets sent by other valid users through full-band sensing, or the state of the system changes to a call initiation state (dialing paging), it proceeds to the next call initiation step.

S2. Call initiation: When a user presses a transmitting key of the communication node to change the system state to the call initiation state, the communication node is taken as the caller; the caller performs fast spectrum sensing on spectra within the frequency band range [f1,f2] set by the system to obtain spectrum information (that is, the frequency point energy distribution of the spectrum, also called spectrum amplitude), and generates feature parameter sets $NTFS_{ct}$ and $NTFS_{cr}$ by using the spectrum information, where $NTFS_{ct}$ is a feature parameter set of a caller transmitted signal; the feature parameter set $NTFS_{cr}$ is packaged in an NTFS field of a caller transmitted data packet and sent out, and then the caller switches to full-band frequency sweep reception; if the responder refuses to establish a communication link, the system returns a busy prompt message, and then automatically switches to the silent reception step; and the process of generating the feature parameter set by using the sensed spectrum information is as follows: based on the spectrum information obtained by fast spectrum sensing, two frequency points with low energy are selected as frequency point parameters, and other parameters can be customized by the user; and these two frequency points are filtered out before the next generation, so as to ensure that the parameter sets generated each time are different.

S3. Matching response: The communication responder is in a silent reception state, autonomously identifies the feature parameter set $NTFS_{ct}$ of the caller transmitted signal through full-band sensing and performs matching reception, parses a received data packet to obtain packet header information, and verifies an RID field in the packet header information to confirm that the other party is calling itself, and the system will pop up an option for the user to choose whether to respond or hang up;

in a case where the user chooses to respond, the responder parses the data packet to obtain the $NTFS_{cr}$ field of the feature parameter set in the NTFS field, uses the same as the feature parameter set of the responder transmitted signal, also performs fast spectrum sensing on the spectra within the frequency band range [f1,f2] set by the system, generates the feature parameter set $NTFS_{rr}$ according to the spectrum information obtained by sensing, packages the feature parameter set $NTFS_{rr}$ into an NTFS field of a responder transmitted data packet and sends the same, and then enters a state transition step;

otherwise, it switches to the silent reception step.

S4. State transition: The communication caller uses its own feature parameter set $NTFS_{cr}$ which is known for matching reception, parses the received data packet to obtain the feature parameter set $NTFS_{rr}$, and then takes this $NTFS_{rr}$ as the NTFS and starts to switch to an autonomous frequency conversion communication stage. This also indicates that the caller and the responder have successfully established a two-way communication link, and both parties have obtained the NTFS fields sent by the other party, and then go to the following real-time autonomous frequency conversion anti-interference process.

In Step 2, that is, the real-time autonomous frequency conversion anti-interference process, after the caller and the communication responder successfully establish a two-way communication link, the two communication parties start autonomous frequency conversion communication. Receivers of the two communication parties, that is, the caller and the responder, autonomously generate the NTFS according to the real-time state of the wireless spectrum environment, and then notify a transmitter of the other party to update its own NTFS by using the NTFS.

Specifically, the receivers of the two communication parties monitor a current frequency point by using a real-time interference detection mechanism, and at the same time, generate a new NTFS in real time every other frequency conversion time slot T through fast spectrum sensing, and inform the transmitter of the other party to adopt this NTFS to transmit signals at the next frequency conversion time. Under the action of potential interfering nodes, the communication caller and responder find that the operating frequency point is disrupted through a real-time interference detection module, adopt a frequency point fast search algorithm to randomly obtain an idle frequency point to replace the disrupted frequency point, and autonomously update other feature parameters of the signal to avoid interference, which significantly improves the anti-interference ability of the wireless communication system. Even if this frequency point is not disrupted, this feature parameter set will be updated automatically after one frequency conversion time slot T, so as to ensure that even if an interfering party senses the frequency point information used this time, it cannot timely interfere with the subsequent communication by interfering with the frequency conversion feature parameter set used in the last communication.

The real-time autonomous frequency conversion anti-interference process is specifically performed as follows.

S1. Frequency conversion communication: The two communication parties use the received feature parameter set NTFS to transmit and receive signals in a frequency conversion manner, after each reception, the data packet is decrypted by using a key generated by a symmetric encryption algorithm or an asymmetric encryption algorithm, and then validity verification is performed; in a case where the verification is passed, it switches to a feature updating step; otherwise, the two communication parties obtain the data packet through full-band frequency sweep; and validity verification refers to comparing whether the field contents of the RID of the received data packet match the CID of the node, if so, it is valid, otherwise it is invalid.

S2. Feature updating: The receivers of the two communication parties perform fast spectrum sensing every other frequency conversion time slot T (the caller and the responder perform this simultaneously), autonomously generate $NTFS_n$ according to sensed spectrum information, and write the same into an NTFS field in the data packet to inform the other party, and then the two communication parties use the feature parameter set $NTFS_n$ to transmit signals, and then switch to a frequency conversion synchronization step.

Specifically, the caller and the responder dynamically update the NTFS and perform autonomous frequency conversion without a common control channel; the receivers of the two communication parties autonomously generate the $NTFS_n$ and package the same into the NTFS field of the data packet; and the data packet containing the $NTFS_n$ is sent to the receiver of the other party through their own transmitter, and then the receiver of the other party receives and parses the $NTFS_n$ in the data packet and updates its own NTFS according to the $NTFS_n$.

S3. Frequency conversion synchronization: A synchronization method combining a reference clock method and, a self-synchronization method, is adopted to accurately synchronize the frequency conversion transmission and reception time of the two communication parties; the specific method is to add a TIME field to the data packet to store its own frequency conversion time; after the other party successfully receives the data packet, a difference between the frequency conversion time value and a local clock is obtained to time the next frequency conversion time, that is, the next frequency conversion countdown=frequency conversion time slot T–(current time-last frequency conversion time); in this way, the two communication parties can perform synchronous frequency conversion at the same text frequency conversion time.

S4. Interference detection: Interference detection refers to the interference detection of receiving frequency points in the process of frequency conversion communication.

To realize the interference detection of receiving frequency points in the process of frequency conversion communication, frequency sweep verification is performed on the receiving frequency point many times in succession; in a case where a legitimate data packet is not received even after multiple frequency sweep verification, it is determined that there is interference at the current receiving frequency point; and then full-band frequency sweep reception is performed, and if still no legitimate data packet is received, a two-way communication link is re-established.

The real-time interference detection mechanism is introduced into the real-time autonomous frequency conversion anti-interference process. In a case where the communication mode fails to receive valid data packets in real-time interference detection, full-band frequency sweep is performed to receive data packets. This mechanism effectively improves the success rate of receiving data packets from the other party, and the real-time interference detection ensures that the system can find and update disrupted frequency points as early as possible, which ensures a high level of reliability for subsequent frequency conversion communication.

Therefore, in the presence of potential interfering nodes, the common control channel-free communication method and system featuring integrated autonomous link establishment and frequency conversion can autonomously and dynamically update the feature frequency set of the transmitted signal in real time to achieve accurate frequency conversion synchronization and interference resistance.

In the embodiment of the invention, during the communication interaction between the two communication parties, the transmitted data packet is also encrypted and decrypted through the RSA algorithm, which is an asymmetric encryption algorithm. The caller (responder) encrypts the data packet using a public key of the responder (caller) and then sends the data packet, and the responder (caller) decrypts the data packet using its own private key.

In the embodiment of the invention, the spectrum sensing algorithm used is divided into full-band spectrum sensing, and arbitrary single or dual frequency point fast spectrum sensing. Full-band spectrum sensing refers to the spectrum sensing of all frequency points within the frequency band [f1,f2] set by the system one by one; while in arbitrary single or dual frequency point fast spectrum sensing, the sensing is ended once any one or two undisturbed and unused idle frequency points are obtained within the frequency band [f1,f2]. This method can effectively shorten the time for replacing the next frequency conversion point and the disrupted frequency point. Full-band spectrum sensing is mainly used in the initial link establishment stage, and arbitrary single or dual frequency point fast spectrum sensing is mainly used in the stage when the system needs to, replace NTFS.

Embodiment 2

Based on the same inventive concept as Embodiment 1 this embodiment provides a common control channel-free communication system featuring integrated autonomous link establishment and frequency conversion, comprising a communication caller and a communication responder which are dynamically and randomly distributed relative to each other, and the caller and the responder communicate by using the communication method as mentioned above.

Compared with the prior art, the invention has the beneficial effects that all communication nodes in the communication system are fully distributed, the system consists of a series of communication nodes which can move at will, and the nodes are dynamically and randomly distributed; the establishment of the communication link is completely autonomous and does not require a common control channel (the updated feature parameter set is put in the transmitted data packet and sent directly); the real-time interference detection mechanism is adopted in the anti-interference process, which can, effectively avoid all types of malicious interference, such as single-tone interference and tracking interference in targeted interference, and significantly reduce the packet loss rate after disruption; and by combining the autonomous link establishment technology with the autonomous frequency conversion anti-interference technology, frequency conflicts among users can be effectively eliminated, so that all valid users can share the spectrum resources in the same frequency band without interfering with each other, effectively solving the prominent contradiction between limited spectrum resources and ever-increasing frequency demands, and significantly improving the confidentiality and anti-interference ability of the wireless communication system.

It should be understood by those skilled in the art that the embodiments of the application can be provided as methods, systems, or computer program products. Therefore, the application may take the form of an entirely hardware embodiment, an entirely software embodiment, or an embodiment combining software and hardware aspects. Furthermore, the application may take the form of a computer program, product implemented on one or more computer usable storage media (including but not limited to magnetic disk memory CD-ROM, optical memory etc.) having computer usable program code embodied therein.

The application is described with reference to flowcharts and/or block diagrams of methods, equipment (systems), and computer program products according to embodiments of the application. It should be understood that each flow and/or block in the flowchart and/or block diagram, and combinations of flows and/or blocks in the flowchart and/or block diagram can be implemented by computer program instructions. These computer program instructions may be provided to a processor of a general purpose computer, special purpose computer, embedded processor, or other programmable data processing equipment to produce a machine, such that the instructions executed by the processor of the computer or other programmable data processing equipment produce a device for implementing the functions specified in one or more flows in the flowcharts and/or one or more blocks in the block diagrams.

These computer program instructions may also be stored in a computer-readable memory which can direct a computer or other programmable data processing apparatus to function in a particular manner, such that the instructions stored in the computer-readable memory produce an article of manufacture including an instruction device which implements the functions specified in one or more flows in the flowcharts and/or one or more blocks in the block diagrams.

These computer program instructions may also be loaded onto a computer or other programmable data processing apparatus such that a series of operational steps are performed on the computer or other programmable apparatus to produce a computer implemented process, such that the instructions executed on the computer or other programmable apparatus provide steps for implementing the functions specified in one or more flows in the flowcharts/or one or more blocks in the block diagrams.

The above embodiments are only preferred ones of the invention, and it should be pointed out that those of ordinary skill in the art can make several improvements and variations without departing from the technical principle of the invention, and these improvements and variations should also fall within the protection scope of the invention.

What is claimed is:

1. A common control channel-free communication method for link establishment and frequency conversion, comprising the following steps:

establishing a two-way communication link between two communication parties which are a transmitting node and a receiving node in a distributed wireless communication system; and performing real-time frequency conversion communication for changing a frequency point between the two communication parties;

wherein in performing real-time frequency conversion communication, a common control channel is not needed when the two communication parties dynamically update NTFS, which is a normalized transmission feature set, for frequency conversion;

the receiving node generates a next normalized transmission feature set $NTFS_n$ through spectrum sensing every other frequency conversion time slot T, and then writes it into a data packet to inform the transmitting node to update the NTFS with the $NTFS_n$, so that the two communication parties transmit signals based on the $NTFS_n$.

2. The common control channel-free communication method for link establishment and frequency conversion according to claim 1, wherein after the two-way communication link is established between the two communication parties, each communication party obtains a feature parameter set sent by an other party, and the two communication parties perform real-time frequency conversion communication based on the obtained feature parameter sets.

3. The common control channel-free communication method for link establishment and frequency conversion according to claim 1, wherein data packet fields transmitted by the two communication parties in the communication process comprise: caller ID CID, responder ID RID, frequency conversion time TIME, transmitted data DATA and next TIME transmitted signal feature parameter set NTFS;

the CID and the RID are used for verifying the identities of the two communication parties;

the TIME is own frequency conversion time, which is used for realizing frequency conversion synchronization between the two communication parties;

the DATA is information content to be transmitted by the two communication parties; and the NTFS is used for autonomously updating a feature parameter set of a signal, including a frequency point, a bandwidth, a waveform, a modulation mode, and other feature parameters, and freely combining the above feature parameters according to system requirements.

4. The common control channel-free communication method for link establishment and frequency conversion according to claim 1, wherein establishing a two-way communication link between two communication parties comprises:

generating, by a caller, feature parameter sets NTFSct and NTFScr through spectrum sensing, taking the NTFSct as a feature parameter set of a caller transmitted signal, and packaging the feature parameter set NTFSer into a data packet for transmission;

identifying, by a responder, the feature parameter set NTFSct of the caller transmitted signal through spectrum sensing, performing matching reception, parsing the received data packet to obtain the feature parameter set NTFScr and using it as a feature parameter set of a responder transmitted signal, and generating a feature parameter set NTFSrr through spectrum sensing and packaging the feature parameter set NTFSrr into a data packet for transmission; and receiving, by the caller, the data packet using its own feature parameter set NTFSer which is known and obtaining the feature parameter set NTFSrr through parsing, which indicates that the caller and the responder successfully establish the two-way communication link.

5. The common control channel-free communication method for link establishment and frequency conversion according to claim 1, further comprising frequency conversion synchronization after performing real-time frequency conversion communication between the two communication parties, wherein the two communication parties inform each other of their own TIME, and then determine a next TIME based on the TIME, current time and a frequency conversion time slot T, so that the two communication parties perform frequency conversion synchronously at the same TIME.

6. The common control channel-free communication method for link establishment and frequency conversion according to claim 1, wherein the real-time frequency conversion communication between the two communication parties further comprises interference detection of a receiving frequency point during the frequency conversion communication process;

specifically, frequency sweep verification is performed on the receiving frequency point many times in succession; in a case where a valid data packet is not received even after multiple times of frequency sweep verification, it is determined that there is interference at the current receiving frequency point; and then a two-way communication link is re-established.

7. The common control channel-free communication method for link establishment and frequency conversion according to claim 1, wherein transmitted data packets are encrypted and decrypted during the communication interaction between the two communication parties.

8. A common control channel-free communication system for link establishment and frequency conversion, comprising a communication caller and a communication responder which are dynamically and randomly distributed relative to each other, wherein the caller and the responder communicate by using the communication method according to claim 1.

* * * * *